(12) United States Patent
Jang

(10) Patent No.: US 11,255,285 B2
(45) Date of Patent: Feb. 22, 2022

(54) VEHICLE AND METHOD OF CONTROLLING ENGINE START FOR THE SAME

(71) Applicants: HYUNDAI MOTOR COMPANY, Seoul (KR); KIA MOTORS CORPORATION, Seoul (KR)

(72) Inventor: Hyung Sun Jang, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/116,362

(22) Filed: Dec. 9, 2020

(65) Prior Publication Data

US 2021/0381456 A1    Dec. 9, 2021

(30) Foreign Application Priority Data

Jun. 9, 2020    (KR) .................. 10-2020-0069685

(51) Int. Cl.
| | |
|---|---|
| *F02D 41/06* | (2006.01) |
| *F02D 41/04* | (2006.01) |
| *F02D 41/12* | (2006.01) |
| *F02N 11/08* | (2006.01) |

(52) U.S. Cl.
CPC ......... *F02D 41/065* (2013.01); *F02D 41/042* (2013.01); *F02D 41/12* (2013.01); *F02N 11/0837* (2013.01); *F02D 2200/602* (2013.01); *F02D 2200/70* (2013.01); *F02N 2200/125* (2013.01)

(58) Field of Classification Search
CPC ...... F02D 41/065; F02D 41/12; F02D 41/042; F02D 2200/70; F02D 2200/602; F02N 11/0837; F02N 2200/125
See application file for complete search history.

(56) References Cited

U.S. PATENT DOCUMENTS

| | | | |
|---|---|---|---|
| 10,273,895 B1* | 4/2019 | Johri ................... | B60W 50/045 |
| 2011/0153152 A1* | 6/2011 | Kim ..................... | F02N 11/0837 |
| | | | 701/33.4 |
| 2012/0138006 A1* | 6/2012 | Gwon ................... | F02N 11/084 |
| | | | 123/179.4 |
| 2012/0142491 A1* | 6/2012 | Gwon ................. | F02N 11/0822 |
| | | | 477/94 |
| 2012/0142492 A1* | 6/2012 | Gwon ................... | B60W 10/06 |
| | | | 477/95 |
| 2012/0143468 A1* | 6/2012 | Kim .................... | F02N 11/0833 |
| | | | 701/102 |

(Continued)

*Primary Examiner* — Joseph J Dallo
(74) *Attorney, Agent, or Firm* — Lempia Summerfield Katz LLC

(57) ABSTRACT

Disclosed are a vehicle and an engine control method for more conveniently restarting an engine in the state in which a function of automatically turning off the engine is activated during braking for improving fuel efficiency. The engine control method includes turning off an engine through an idle stop and go (ISG) system during braking due to manipulation of a brake pedal, determining whether at least one preset starting condition is satisfied based on information on a forward environment, and turning on the engine irrespective of whether manipulation of the brake pedal is released when any one of the at least one starting condition is satisfied.

19 Claims, 4 Drawing Sheets

(56) References Cited

U.S. PATENT DOCUMENTS

| | | | |
|---|---|---|---|
| 2015/0019114 A1* | 1/2015 | Jang | F02N 11/0837 |
| | | | 701/113 |
| 2015/0167614 A1* | 6/2015 | Malone | B60W 10/11 |
| | | | 701/54 |
| 2016/0318523 A1* | 11/2016 | Kim | F02N 11/0837 |
| 2017/0274893 A1* | 9/2017 | Huh | F02D 41/065 |
| 2018/0141538 A1* | 5/2018 | Doering | B60K 6/50 |
| 2019/0219019 A1* | 7/2019 | Khafagy | B60W 10/08 |
| 2020/0040861 A1* | 2/2020 | Loveall | F02N 19/005 |

* cited by examiner

VEHICLE AND METHOD OF CONTROLLING ENGINE START FOR THE SAME

This application claims priority to and the benefit of Korean Patent Application No. 10-2020-0069685, filed on Jun. 9, 2020, the entire contents of which are incorporated herein by reference.

FIELD

The present disclosure relates to a vehicle and an engine start control method for more conveniently restarting an engine of the vehicle.

BACKGROUND

The statements in this section merely provide background information related to the present disclosure and may not constitute prior art.

Recently, vehicles including an internal combustion engine, which have a function of automatically turning off the vehicle during braking through manipulation of a brake pedal and turning on the vehicle again when manipulation of the brake pedal is released, have been increasingly used in order to protect environment and improve fuel efficiency.

This function is referred to as an idle stop and go (ISG) system or function.

A recent vehicle includes various detectors for recognizing an obstacle such as a forward vehicle, and thus provides a function of notifying start of the forward vehicle by outputting notification information when the forward vehicle starts in a situation in which a subject vehicle stops together with the forward vehicle. Due to the front vehicle start alarm function, a driver may not experience inconvenience of looking forward during braking.

However, we have discovered that when the aforementioned ISG function is activated and an engine is turned off during braking, even if a driver recognizes that a forward vehicle starts through notification, there is a problem in that start is slow due to delay until an engine is turned on again after a brake pedal is released.

SUMMARY

The present disclosure provides a vehicle including a more convenient idle stop and go (ISG) system and an engine control method for the vehicle.

In particular, the present disclosure provides a vehicle including an ISG system, which more rapidly starts in the state in which the ISG system is activated, and an engine control method for the vehicle.

The technical problems solved by the forms of the present disclosure are not limited to the above technical problems and other technical problems which are not described herein will become apparent to those skilled in the art from the following description.

In one form of the present disclosure, as embodied and broadly described herein, an engine control method includes: turning off an engine through an idle stop and go (ISG) system during braking due to manipulation of a brake pedal, determining whether at least one preset starting condition is satisfied based on information on a forward environment, and turning on the engine irrespective of whether manipulation of the brake pedal is released when any one of the at least one starting condition is satisfied.

In another aspect of the present disclosure, a vehicle includes an engine, and a controller configured to determine whether the engine is turned on when the engine is turned off through an idle stop and go (ISG) system during braking due to manipulation of a brake pedal, wherein the controller includes a sensor data processor configured to acquire information on a forward environment, a starting condition determiner configured to determine whether at least one preset starting condition is satisfied based on the information on the forward environment, and a controller configured to perform control to turn on the engine irrespective of whether manipulation of the brake pedal is released when any one of the at least one starting condition is satisfied.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
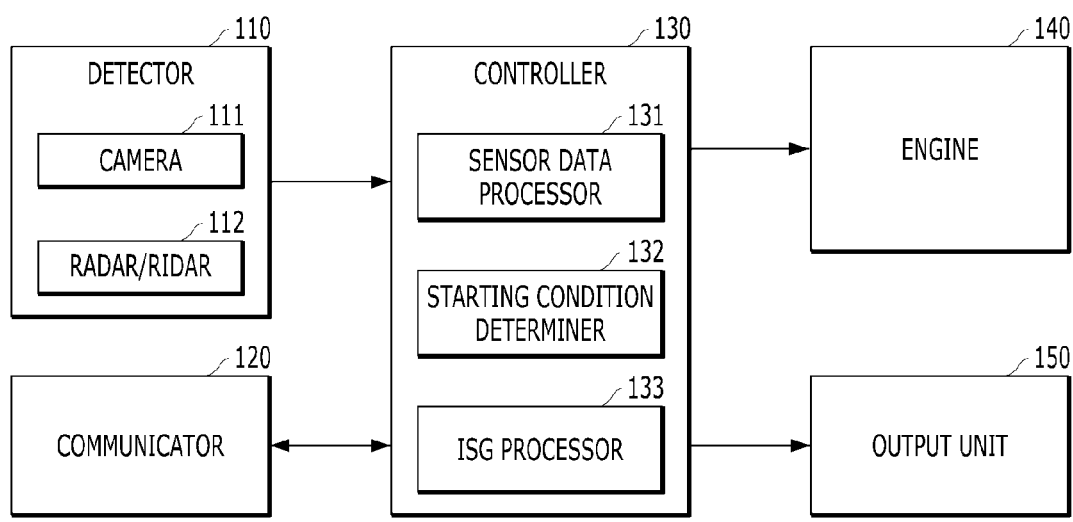
FIG. 1 is a block diagram showing an example of the configuration of a vehicle to which forms of the present disclosure are applicable.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail with reference to the accompanying drawings so that those of ordinary skill in the art may easily implement the same. However, the present disclosure may be implemented in various different forms, and is not limited to these forms. To clearly describe the present disclosure, parts not concerning the description are omitted from the drawings, and like reference numerals denote like elements throughout the specification.

In addition, when a certain part "includes" a certain component, this indicates that the part may further include other components, rather than necessarily excluding such other components, unless there is no disclosure to the contrary. The same reference numbers will be used throughout the drawings and the specification to refer to the same parts.

In the following description, a function of automatically turning off the vehicle during braking through manipulation of a brake pedal and turning on the vehicle again when manipulation of the brake pedal is released will be referred to as an "idle stop and go (ISG) function" for convenience.

Generally, the ISG function has an engine-off restrictive condition such as wearing a seat belt, the state of a battery, the state of a brake, an outdoor temperature, a maximum reachable vehicle speed prior to braking, an air conditioning situation, or a gradient and has a forced restarting condition such as reduction in a brake pressure or reduction in the state of a battery. However, in the following description, a situation in which it is impossible to turn off an engine due to an engine-off restrictive condition and a situation in which a forced restarting condition is satisfied except for automatic restart due to satisfaction of a condition for start according to forms of the present disclosure are excluded from the description for apparent understanding unless specially described otherwise According to one form of the present disclosure, even if an ISG function is activated and an engine is turned off during braking through manipulation of a brake pedal and then manipulation of the brake pedal is not released, a current situation may become a situation in which a vehicle is capable of starting, the engine may be automatically restarted. To this end, the configuration of a vehicle will be described with reference to FIG. 1.

FIG. 1 is a block diagram showing an example of the configuration of a vehicle to which forms of the present disclosure are applicable.

Referring to FIG. 1, the vehicle may include a detector 110, a communicator 120, a controller 130, an engine 140, and an output unit 150. Here, the vehicle illustrates components related to the forms of the present disclosure, and thus it will be obvious to one of ordinary skill in the art that greater or fewer components may alternatively be implemented in reality.

Hereinafter, each of the components will be described in detail.

First, in order to acquire information on at least a forward environment of a region around the vehicle, the detector 110 may include a camera 111 and a Radar/light detection and ranging (LiDAR) 112. The camera 111 may be disposed to photograph at least a forward part (e.g., a forward image) of a subject vehicle, and may acquire an image for recognizing a forward vehicle, a traffic light, a toll bar (a horizontal bar), or the like.

The Radar/RiDAR 112 may detect a direction, a distance, a relative speed, or the like of a subject vehicle with respect to a forward obstacle (a vehicle or a toll bar).

Here, the Radar may refer to an electromagnetic wave-based sensor, and the RiDAR may refer to a laser-based sensor, but the configuration of the detector 110 is merely exemplary and the detector 110 may be any type of sensor that recognizes the presence and state change of a forward object.

The communicator 120 may communication with an object outside the vehicle according to a predetermined protocol. For example, the communicator 120 may exchange data of a nearby infrastructure or a nearby vehicle and a forward environment through a communication protocol corresponding to a vehicle to infrastructure (V2I) or a vehicle to vehicle (V2V).

As an example of exchanged information, in the case of the V2V, information on whether a forward vehicle is moved may be acquired from a forward vehicle of a subject vehicle, and in the case of the V2I, a signal state (e.g., green, red, orange, left turn, or right turn) of a nearby (in particular, forward) traffic light, information on an opening and closing state of a toll bar, or the like may be acquired, but the present disclosure is not limited thereto.

The controller 130 may include a sensor data processor 131 for generating information on a nearby situation and improving the accuracy of the information by synthesizing information acquired through the detector 110 and the communicator 120 (e.g., sensor fusion), a starting condition determiner 132 for determining whether a starting condition is satisfied based on the information on the nearby situation determined by the sensor data processor 131, and an ISG processor 133 for transmitting an engine start command to the engine 140 in response to determination of the starting condition determiner 132 irrespective of whether manipulation of a brake pedal is released.

According to one form, the controller 130 may be embodied as an engine management system (EMS) or an advanced driver assistance system (ADAS) for controlling the engine 140, and in the case of an eco-friendly vehicle, the controller 130 may be embodied using one function of a controller for directly/indirectly controlling a powertrain, such as a hybrid control unit (HCU), and may be embodied in the form of a separate controller for managing an engine control function in one form, but the present disclosure is not limited thereto.

The engine 140 may also be applied to any type of an internal combustion engine that turns on/off a start sate using the ISG function.

The output unit 150 may output a vehicle change state, for example, whether a starting condition is satisfied or whether the engine starts based on the satisfied condition and satisfaction of the starting condition in the form recognized by a driver. For example, for visual output, the output unit 150 may include at least one of a cluster, a head up display (HUD), or a display of a head unit, and for audible output, the output unit 150 may include at least one speaker. The output unit 150 may include at least one vibration module for haptic output.

Hereinafter, an engine control procedure according to another form will be described based on the aforementioned configuration of a vehicle.

Figure 2:
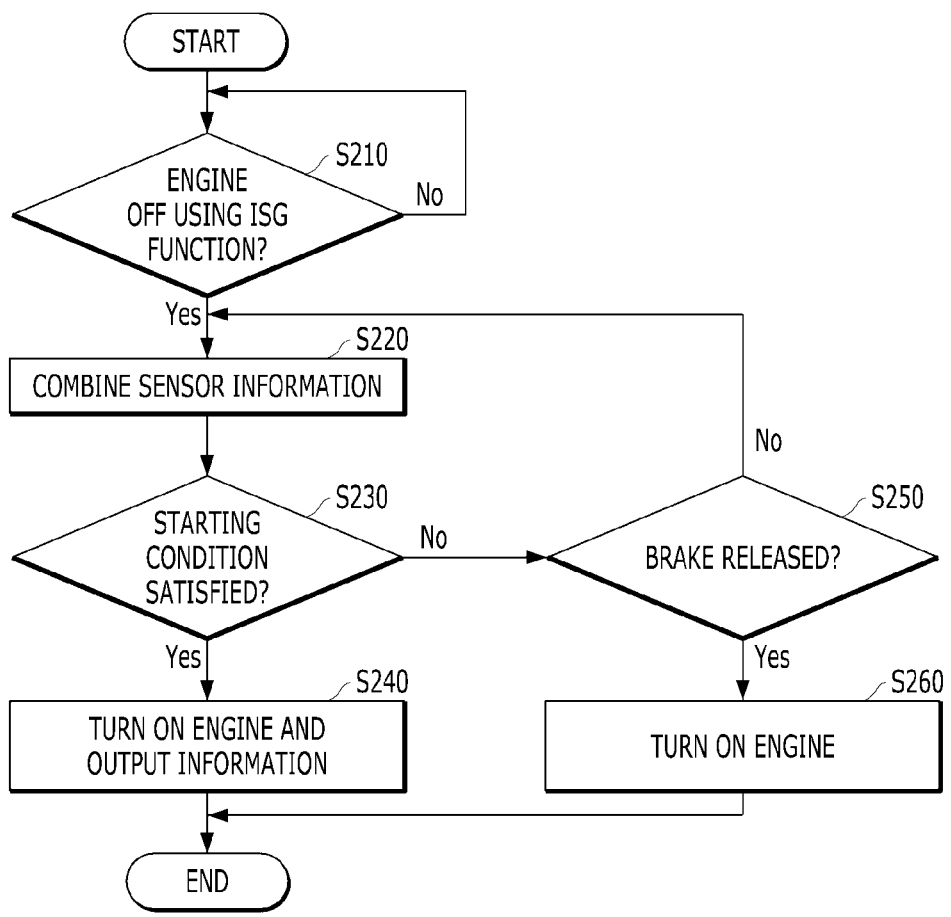
FIG. 2 is a flowchart showing an example of an engine control procedure according to one form of the present disclosure.

FIG. 2 is a flowchart showing an example of an engine control procedure in one form of the present disclosure.

Referring to FIG. 2, when an engine is turned off (i.e., stop through manipulation of a brake pedal in the case in which an ISG function is activated) using the ISG function (YES of S210), the sensor data processor 131 of the controller 130 may combine information acquired through the detector 110 and the communicator 120 to determine a nearby environment (S220).

For example, the sensor data processor 131 may detect the state of a traffic light based on the image acquired through the camera 111, may detect the position of a forward vehicle, or may detect a forward obstacle (e.g., a toll bar) but not a vehicle. The sensor data processor 131 may determine whether a nearby (forward) vehicle moves, the state of a traffic light, or the like based on the information acquired through the communicator 120. The sensor data processor 131 may recognize the longitudinal/lateral position and the longitudinal/lateral speed of the forward vehicle based on the information acquired through the Radar/RiDAR 112. In some forms, the information acquired through the detector 110 may also be transmitted to the controller 130 in the form processed in a predetermined format through an ADAS controller. In addition, the sensor data processor 131 may combine the information acquired through the detector 110 and the communicator 120 and may improve the accuracy of information of each of external objects acquired using different methods.

The starting condition determiner 132 may determine whether a preset starting condition is satisfied based on the information on a nearby environment, output by the sensor data processor 131 (S230). A detailed example of the starting condition will be described below in more detail with reference to FIG. 3.

When at least one of the starting condition is satisfied (YES of S230), the ISG processor 133 may transmit a start command to the engine 140 or an engine controller and may restart the engine 140 (S240). In this case, engine start according to the start command of the ISG processor 133 may be performed irrespective of whether manipulation of a brake pedal is released in the state in which the ISG function is activated. Output of information corresponding to satisfaction of at least one of the starting conditions (YES of S230) may be performed together with engine start. Here, the information output may include information output for a driver through the output unit 150 and information output through the communicator 120 with respect to an external object. Output of information through the output unit 150 may include at least one of a type of the satisfied starting condition or information indicating that engine start is performed based on the condition, and output of information through the communicator 120 may be information that notifies a nearby vehicle or infrastructure of information indicating that the current state becomes the state in which a subject vehicle is capable of starting or information indicating that the vehicle is supposed to start soon, but the present disclosure is not limited thereto.

When the starting condition is not satisfied (NO of S230), a controller for controlling an ISG function may monitor whether manipulation of a brake is released (S250), and when manipulation of the brake is released (YES of S250), the controller may perform engine-on control depending on default logic of an ISG function (S260). Here, the controller for controlling the ISG function may be the controller 130 or a different controller therefrom in some forms.

Hereinafter, the starting condition will be described with reference to FIG. 3.

Figure 3:
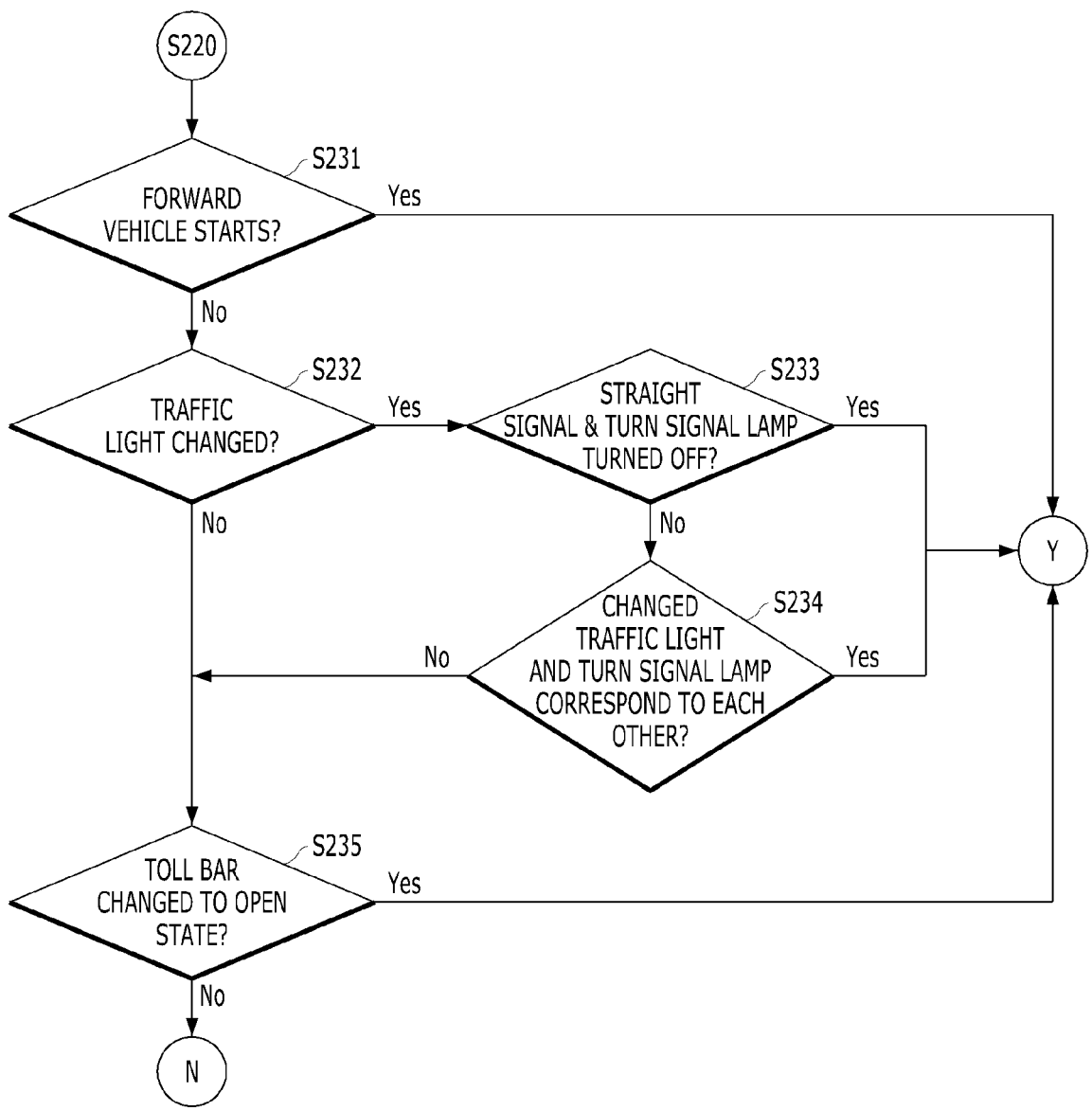
FIG. 3 is a flowchart showing an example of a procedure of determining whether the starting condition of FIG. 2 is satisfied.

FIG. 3 is a flowchart showing an example of a procedure of determining whether the starting condition of FIG. 2 is satisfied. A determination order shown in FIG. 3 is merely exemplary, and thus a turn for determining each condition may be changed, or determination may also be performed simultaneously irrespective of determination of another condition.

Referring to FIG. 3, when the current state corresponds to at least one of the state in which a forward vehicle is determined to start based on output information of the sensor data processor 131 (YES of S231), the state in which a traffic light is changed (YES of S232), the state in which a forward traffic light is a straight signal and a turn signal lamp is turned off (YES of S233), the state in which the changed traffic light and a turn signal lamp correspond to each other (YES of S234), or the state in which a forward toll bar is changed to an open state (YES of S235), the starting condition determiner 132 may determine that the starting condition is satisfied (YES of S230).

Here, the straight signal may refer to turning on a general green signal, and when a vehicle is capable of traveling only in a specific direction but not in a straight direction depending on the shape of a road, a single having an arrow shape indicating a corresponding direction may also correspond to the straight signal.

The case in which the changed signal and the turn signal lamp correspond to each other may include the case in which a right turn signal lamp is turned on when a signal light at a road side, which indicates whether a vehicle is capable of turning to the right at a three-way intersection or the like, becomes green, and the case in which a left turn signal lamp is turned on when a left turn signal lamp or a U-turn signal lamp is turned on, but this is merely exemplary and the present disclosure is not limited thereto.

Figure 4:
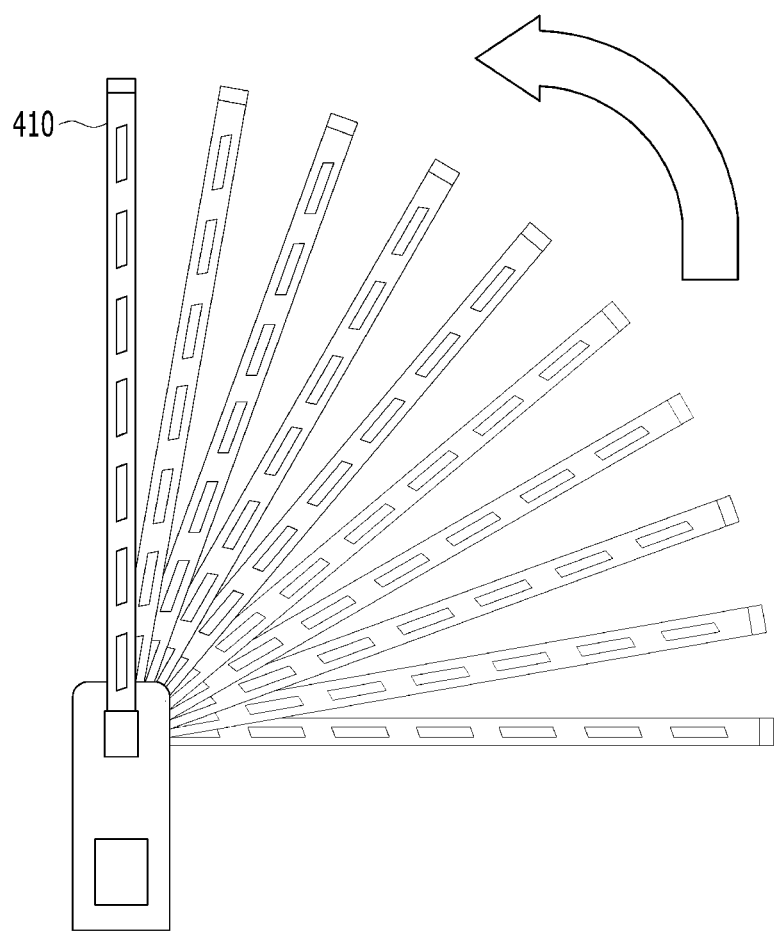
FIG. 4 illustrates an example of a change in the state of a toll bar.

The case in which the state of a toll bar is changed to an open state will be described with reference to FIG. 4. FIG. 4 illustrates an example of a change in the state of a toll bar.

Referring to FIG. 4, a forward obstacle 410 formed like a bar extending in a horizontal direction may be recognized in an image captured through the camera 111, and the starting condition determiner 132 may determine a change to an open state of the toll bar based on whether an angle of the corresponding obstacle 410 with respect to the ground is changed (e.g., rises). Needless to say, this is merely exemplary, and a change in the state of a toll bar may also be determined based on whether the shape of the toll bar is changed, but not whether the angle of the toll bar with respect to the ground is changed.

Through the forms described thus far, a driver may not experience inconvenience of looking forward through output of notification when a starting condition is satisfied in a situation in which a vehicle is turned off during braking using ISG, and the vehicle is turned on irrespective of whether a brake pedal is manipulated, and accordingly, it may be convenient that the vehicle rapidly starts along with release of a brake pedal.

The vehicle related to at least one form of the present disclosure as configured above may more rapidly start in the state in which an idle stop and go (ISG) system is activated.

In particular, according to the present disclosure, when the current state becomes the state in which a vehicle is capable of starting from the state in which an engine is turned on through an ISG system, even if manipulation of a brake pedal is not released, the vehicle is turned on and thus is capable of rapidly starting.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer-readable code stored on a computer-readable recording medium. The computer-readable recording medium is any data storage device that can store data which can thereafter be read by a computer. Examples of the computer-readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the present disclosures. Thus, it is intended that the present disclosure cover the modifications and variations of the exemplary forms of present disclosure.

What is claimed is:
1. An engine control method comprising:
   turning off, by a controller, an engine by an idle stop and go (ISG) system during braking due to manipulation of a brake pedal of a vehicle;
   determining, by the controller, whether at least one preset starting condition is satisfied based on information on a forward environment of the vehicle; and turning on, by the controller, the engine irrespective of whether manipulation of the brake pedal is released when the at least one preset starting condition is satisfied;

wherein turning off the engine and turning on the engine are performed while an ISG function of the ISG system is activated.

2. The engine control method of claim 1, wherein the at least one preset starting condition comprises at least one of a forward vehicle start condition, a traffic light changing condition, or an obstacle state changing condition.

3. The engine control method of claim 2, further comprising: determining, by the controller, that the traffic light changing condition is satisfied when a traffic light is changed to a straight signal in a state in which a turn signal lamp of the vehicle is not turned on or the turn signal lamp that is turned on corresponds to a changed signal of the traffic light.

4. The engine control method of claim 2, further comprising: determining, by the controller, that the obstacle state changing condition is satisfied when a toll bar is changed to an open state.

5. The engine control method of claim 1, further comprising: acquiring the information on the forward environment by at least one of a detector or a communicator.

6. The engine control method of claim 5, wherein the detector comprises at least one of a camera, a Radar, or a Radar-light detection and ranging (LiDAR), which are configured to acquire a forward image of the vehicle.

7. The engine control method of claim 5, further comprising: communicating, by the communicator, with a nearby vehicle or a nearby infrastructure, and acquiring at least one of information on a behavior of the nearby vehicle or information on a nearby traffic light.

8. The engine control method of claim 1, further comprising: when the at least one preset starting condition is satisfied, outputting, by an output unit, notification information corresponding to the satisfied preset starting condition or engine-on.

9. The engine control method of claim 8, wherein outputting the notification information comprises: transmitting information indicating that the vehicle is capable of starting or is supposed to start, to a nearby vehicle or a nearby infrastructure through a communicator.

10. A non-transitory computer-readable recording medium having a program recorded thereon, the program to direct a processor to perform acts of:
turning off an engine by an idle stop and go (ISG) system during braking due to manipulation of a brake pedal of a vehicle;
determining whether at least one preset starting condition is satisfied based on information on a forward environment of the vehicle; and
turning on the engine irrespective of whether manipulation of the brake pedal is released when the at least one preset starting condition is satisfied, wherein turning off the engine and turning on the engine are performed while an ISG function of the ISG system is activated.

11. A vehicle comprising:
an engine; and
a controller configured to determine whether to turn on the engine when an idle stop and go (ISG) system has turned off the engine based on manipulation of a brake pedal of the vehicle,
wherein the controller comprises:
a sensor data processor configured to acquire information on a forward environment of the vehicle;
a starting condition determiner configured to determine whether at least one preset starting condition is satisfied based on the information on the forward environment; and
an ISG controller configured to perform a control to cause the ISG system to turn on the engine irrespective of whether the brake pedal is released when the at least one preset starting condition is satisfied.

12. The vehicle of claim 11, wherein the at least one preset starting condition comprises at least one of a forward vehicle start condition, a traffic light changing condition, or an obstacle state changing condition.

13. The vehicle of claim 12, wherein the traffic light changing condition is satisfied when a traffic light is changed to a straight signal in a state in which a turn signal lamp of the vehicle is not turned on or the turn signal lamp that is turned on corresponds to a changed signal of the traffic light.

14. The vehicle of claim 12, wherein the obstacle state changing condition is satisfied when a toll bar is changed to an open state.

15. The vehicle of claim 11, wherein the information on the forward environment is acquired through at least one of a detector or a communicator.

16. The vehicle of claim 15, wherein the detector comprises at least one of a camera, a Radar, or a Radar-light detection and ranging (LiDAR), which are configured to take a forward image of the vehicle.

17. The vehicle of claim 15, wherein the communicator is configured to communicate with a nearby vehicle or a nearby infrastructure and acquire at least one of information on a behavior of the nearby vehicle or information on a nearby traffic light.

18. The vehicle of claim 11, further comprising:
an output unit configured to output notification information when the at least one preset starting condition is satisfied, wherein the output notification information corresponds to the satisfied preset starting condition or engine-on.

19. The vehicle of claim 18, further comprising:
a communicator configured to transmit information indicating that the vehicle is capable of starting or is supposed to start to a nearby vehicle or a nearby infrastructure when the at least one preset starting condition is satisfied.

* * * * *